United States Patent
Heubi

(10) Patent No.: US 12,040,705 B2
(45) Date of Patent: Jul. 16, 2024

(54) SELF CLOCKED LOW POWER DOUBLING CHARGE PUMP

(71) Applicant: SEMICONDUCTOR COMPONENTS INDUSTRIES, LLC, Phoenix, AZ (US)

(72) Inventor: Alexander Heubi, La Chaux-de-Fonds (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/817,116

(22) Filed: Aug. 3, 2022

(65) Prior Publication Data

US 2023/0057051 A1  Feb. 23, 2023

Related U.S. Application Data

(60) Provisional application No. 63/260,460, filed on Aug. 20, 2021.

(51) Int. Cl.
*H02M 3/07* (2006.01)

(52) U.S. Cl.
CPC ................... *H02M 3/073* (2013.01)

(58) Field of Classification Search
None
See application file for complete search history.

(56) References Cited

U.S. PATENT DOCUMENTS

| | | | | |
|---|---|---|---|---|
| 5,457,421 A | * | 10/1995 | Tanabe | H03H 19/004 327/333 |
| 5,847,597 A | * | 12/1998 | Ooishi | G11C 5/143 327/543 |
| 5,941,990 A | * | 8/1999 | Hiiragizawa | G11C 5/145 713/323 |
| 6,031,397 A | * | 2/2000 | Banba | G11C 5/145 327/80 |
| 6,281,716 B1 | * | 8/2001 | Mihara | H03K 5/2481 327/143 |
| 6,424,578 B2 | * | 7/2002 | Sim | G11C 5/145 363/59 |
| 6,560,145 B2 | * | 5/2003 | Martines | G11C 5/145 365/185.23 |
| 7,071,748 B2 | * | 7/2006 | Wich | G11C 5/145 327/24 |
| 7,123,079 B2 | * | 10/2006 | Do | G11C 5/145 363/59 |
| 7,427,889 B2 | * | 9/2008 | Lin | H02M 3/07 363/59 |
| 7,518,433 B2 | * | 4/2009 | Park | H02M 3/07 363/60 |

(Continued)

*Primary Examiner* — Thomas J. Hiltunen
(74) *Attorney, Agent, or Firm* — Polansky & Associates, P.L.L.C.; Paul J. Polansky; Nathan H. Calvert

(57) ABSTRACT

A high voltage is generated from a low supply voltage by a charge pump driven with a pulse generator. A comparator compares the low supply voltage to a predetermined proportion of the high voltage. A low power voltage divider creates the predetermined portion of the high voltage. The comparator output drives the pulse generator, and the pulse generator output resets the comparator. A high voltage to low voltage mode may also be employed using the same arrangement.

19 Claims, 2 Drawing Sheets

(56) References Cited

U.S. PATENT DOCUMENTS

| | | | | |
|---|---|---|---|---|
| 7,535,307 B2* | 5/2009 | Lee | ............ | G11C 5/14 |
| | | | | 331/74 |
| 7,999,605 B2* | 8/2011 | Seo | ............ | H02M 3/07 |
| | | | | 327/536 |
| 8,049,553 B2* | 11/2011 | Kim | ............ | G11C 5/145 |
| | | | | 363/60 |
| 9,042,167 B2* | 5/2015 | Kwon | ............ | G11C 13/004 |
| | | | | 365/163 |
| 9,154,028 B2* | 10/2015 | Wang | ............ | H02M 3/07 |
| 9,176,514 B2* | 11/2015 | Huang | ............ | G05F 3/20 |
| 9,219,409 B2* | 12/2015 | Shao | ............ | H02M 3/07 |
| 9,553,572 B2* | 1/2017 | Powell | ............ | H02M 3/07 |
| 9,853,540 B2* | 12/2017 | Aiura | ............ | H02M 3/158 |
| 10,277,209 B2* | 4/2019 | Hsieh | ............ | H02M 3/07 |
| 11,070,128 B2* | 7/2021 | Rana | ............ | G11C 16/30 |
| 11,271,476 B2* | 3/2022 | Ichihashi | ............ | H02M 3/07 |
| 11,336,176 B1* | 5/2022 | Hong | ............ | H02M 1/088 |
| 11,393,521 B2* | 7/2022 | Ji | ............ | G11C 11/4074 |
| 2010/0246305 A1* | 9/2010 | Yang | ............ | G11C 5/14 |
| | | | | 327/536 |
| 2012/0139620 A1 | 6/2012 | Raghavan | | |
| 2014/0266410 A1* | 9/2014 | Wang | ............ | H02M 3/07 |
| | | | | 327/536 |
| 2016/0118882 A1* | 4/2016 | Savanth | ............ | H02M 3/07 |
| | | | | 327/307 |
| 2020/0259484 A1 | 8/2020 | Burgener et al. | | |

* cited by examiner

SELF CLOCKED LOW POWER DOUBLING CHARGE PUMP

This application claims the benefit of U.S. Provisional Patent Application No. 63/260,460, filed on Aug. 20, 2021, the entire contents of which are incorporated herein by reference.

FIELD OF THE INVENTION

The disclosure relates to power supply circuitry for integrated circuits, and particularly to charge pump circuits.

BACKGROUND

Charge pumps are a form of voltage converter circuits that move energy from one voltage level to another by charging a storage element, typically a capacitor, and switching the storage element to a configuration in which the energy is provided at a different voltage. A charge pump may create an output voltage that is higher or lower than a source voltage, and may even create inverted voltages.

Charge pumps are often used for providing a regulated voltage in a low-power mode and a high power mode. To save power, the oscillator used for switching the charge pump may be slowed down during low-power operation, because generally less power is required from the regulated voltage and therefore less charge needs to be pumped. However, generally an oscillator consumes a relatively large amount of power compared to the power consumption of an IC in sleep mode. Furthermore, for low-power modes such as the "sleep" modes employed on integrated circuits (ICs) of many types, when selecting a frequency at which to switch a charge pump for low-power mode operation, the worst-case load currents and leakage currents must be accounted for. Operating a charge pump at this frequency inherently results in inefficiencies for a large proportion of the time the IC is in sleep mode, when worst case conditions are not met.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Figure 1:
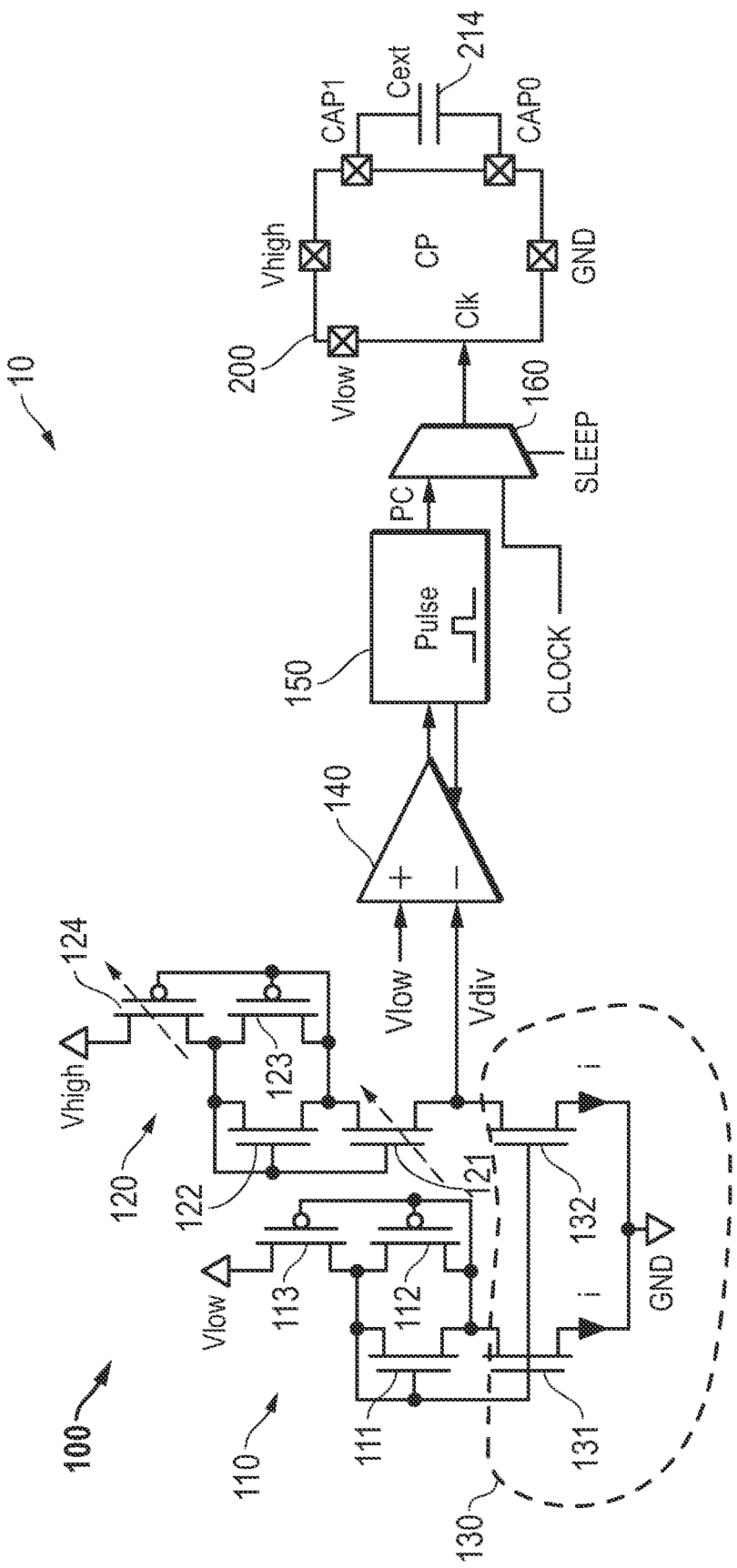
FIG. 1 illustrates in mixed block diagram and circuit diagram form a charge pump circuit according to some embodiments.

FIG. 1 illustrates in mixed block diagram and circuit diagram form a charge pump circuit 10 according to some embodiments. Charge pump circuit 10 is generally embodied on an integrated circuit but may include certain external components such as capacitors. Charge pump circuit 10 is suitable for use in integrated circuits that operate with a low-power mode, such as a sleep mode, and a high power mode. It is able to operate without an oscillator providing a clock signal in the low-power mode, providing numerous advantages. Charge pump circuit 10 generally operates to create a high voltage Vhigh from a low supply voltage Vlow in a boost mode, and in some embodiments can also function produce a low voltage Vlow from a high voltage Vhigh in a buck mode. Charge pump circuit 10 includes a voltage divider circuit 100, a comparator 140, a pulse generator 150, a multiplexer 160, and a charge pump 200.

Voltage divider circuit 100 includes a first input connected to a low voltage terminal labelled "Vlow", a second input connected to a high voltage terminal labelled "Vhigh", and an output providing a divided voltage labelled "Vdiv". Vlow and Vhigh are used herein to refer to the voltage terminals and to the voltages thereon. Voltage divider circuit 100 generally includes a reference current generator 110, a voltage divider 120, and a current mirror 130.

Reference current generator 110 generally includes an input supplied with low supply voltage Vlow, and a reference current generator output. Current mirror 130 generally includes a current mirror input connected to the reference current generator output, and a current mirror output connected to voltage divider 120, and a terminal connected to the voltage supply ground labelled "GND". Voltage divider 120 generally includes a first terminal coupled to the high voltage terminal Vhigh, a second terminal coupled to the current mirror output, and an output providing the divided voltage Vdiv.

Referring in more detail to the various parts of voltage divider circuit 100, in this implementation, reference current generator 110 includes an n-type metal-oxide semiconductor (NMOS) transistor 111, p-type metal-oxide semiconductor (PMOS) transistor 112, and PMOS transistor 113. NMOS transistor 111 includes a drain, a source connected to the current mirror input (at an NMOS transistor 131), and a gate connected to its drain. PMOS transistor 112 includes a drain connected to the source of NMOS transistor 111, a source connected to the drain of NMOS transistor 111, and a gate connected to its drain. PMOS transistor 113 includes a source receiving the low supply voltage Vlow, a drain connected to the source of PMOS transistor 112, and a gate connected to the gate of PMOS transistor 112.

Voltage divider 120 includes an NMOS transistor 121, an NMOS transistor 122, a PMOS transistor 123, and a PMOS transistor 124. NMOS transistor 121 includes a source connected to the output of current mirror 130, a drain, and a gate. NMOS transistor 122 includes a source connected to the drain of NMOS transistor 121, a drain, and a gate connected to its drain and connected to the gate of NMOS transistor 121. PMOS transistor 123 incudes a drain connected to the source of NMOS transistor 122, a source, and a gate connected to its drain. PMOS transistor 124 includes a source connected to the high voltage terminal Vhigh, a drain connected to the source of PMOS transistor 123, and a gate connected to the gate of PMOS transistor 123. As depicted by arrows on NMOS transistor 121 and PMOS transistor 124, in this implementation, these transistors both have an adjustable voltage threshold (Vth) which are adjusted under control of separate control inputs. In some implementations, the Vth may be adjusted by adjusting the length of gates in the transistors, for example by implementing transistors 121 and 124 with multiple transistors in series, and selectively removing multiple transistors from the series by shorting across them with another transistor. The other transistor is activated by a control signal, and typically having a smaller gate length than the composite transistors making up transistors 121 and 124. Other suitable methods may be used for adjusting transistors 121 and 124.

Current mirror 130 includes an NMOS transistor 131 and an NMOS transistor 132. NMOS transistor 131 includes a source coupled to the power supply ground GND, a drain connected to the current mirror input, and a gate connected to the gate of third NMOS transistor 111. NMOS transistor 132 includes a source coupled to the power supply ground GND, a drain connected to the current mirror output, and a gate connected to the gate of NMOS transistor 131.

Comparator 140 includes a first input receiving the divided voltage Vdiv, a second input connected to the low voltage supply to receive the voltage Vlow, a reset input, and a comparator output.

Pulse generator 150, labelled "Pulse", includes an input connected to the comparator output of comparator 140, and an output labelled "PC" for providing an output pulse chain also referred to as "PC" herein. Output PC is connected to the reset input of comparator 140 as indicated by the arrow from pulse generator 150 to comparator 140. Output PC, in this implementation, is also coupled to a clock input "Clk" of charge pump 200 through multiplexer 160.

Multiplexer 160 has a first input receiving a clock signal labelled "CLOCK", a second input connected to output PC of pulse generator 150, a control input receiving a sleep signal labelled "SLEEP", and an output connected to the Clk input of charge pump 200.

In this implementation, charge pump 200 includes a low voltage terminal receiving or output the low supply voltage Vlow, a high voltage terminal receiving or providing the high voltage Vhigh, a clock input Clk, an input connected to power supply ground GND, and first and second IC terminals labelled "CAP0" and "CAP1" for connecting to an external capacitor 214 labelled "Cext".

In operation, charge pump circuit 10 provides high voltage Vhigh from low supply voltage Vlow during a low-power or sleep mode and during a normal operating or "wake" mode on the host integrated circuit. Charge pump circuit 10 may also be operated to produce low supply voltage Vlow from high supply voltage Vhigh. Typically a particular instantiation of charge pump circuit 10 will act as a boost or buck converter, and does not perform both functions in the same circuit, although such functionality is possible. The output of pulse generator 150 is selectively coupled charge pump 200's clock input Clk during the sleep mode, and the clock signal CLOCK is selectively coupled to clock input Clk through multiplexer 160 during the wake mode. In the low-power mode, comparator 140 compares the low supply voltage Vlow to a predetermined proportion of the high voltage Vhigh. Pulse generator 150 is driven with a result of the comparison, and when a pulse is generated based on this result, comparator 140 is reset based on the output of pulse generator 150. This ensures that pulse chain PC is pulsed at irregular intervals just frequently enough to keep the divided voltage Vdiv at the level of Vlow. As such, the circuit is able to operate without clock signal CLOCK in the low-power mode, allowing clock signal CLOCK to be removed by turning off its oscillator, or slowed down greatly, without preventing the charge pump from pumping sufficient charge to produce the desired voltage.

In this implementation, voltage divider 120 is also configurable to adjust the voltage level of the voltage produced by charge pump 200, whether it is in a configuration with Vlow as an input and Vhigh as an output, or Vhigh as an input and Vlow as an output, by adjusting the amount of division in voltage divider 100. Generally, Vdiv is a predetermined portion or fraction of Vhigh. The predetermined portion can be adjusted, for example from a first predetermined portion to a second predetermined portion of Vhigh by adjusting two transistors in voltage divider 100.

Reference current generator 120 operates not only operates to generate a reference current, but in combination with NMOS transistor 131 of current mirror 130, operates as a very low power voltage divider. Transistors 111, 112, and 113 generate a reference current of a few nano-amps (nA) typically. This current is mirrored by NMOS transistor 132 and flows through transistors 121, 122, 123, and 124. NMOS transistor 121 and PMOS transistor 124 can be adjusted using switches (not shown separately) to provide a range of division amounts for voltage divider 130. For example, in this implementation, several division values are useful. Voltage divider 130 is configurable to divide Vhigh by 2, by a value greater than 2 (typically 2.2), or by a value less than 2 (typically 1.8). These division values are employed as follows.

When charge pump 200 is used with Vlow as an input and Vhigh as an output, generally for some applications charge pump 200 is required to slightly less than double Vlow. Voltage divider 130 is set to divide Vhigh by 1.8 to produce Vdiv. Comparator 140 and pulse generator 150 provide a clock pulse to the charge pump in the doubling mode each time Vhigh becomes less than 1.8*Vlow, pumping charge to the Vhigh output to cause the voltage to increase again above the 1.8*Vlow threshold. These values are merely examples, and the boost and buck operations described herein can be employed with a range of division values for Vdiv, to produce a range of boosted voltages for Vhigh or a range of voltages for Vlow.

When charge pump 200 is used with Vhigh as an input and Vlow as an output, charge pump 200 operates in a buck mode to provide Vlow at a desired value lower than Vhigh. In one scenario, a buck mode is used to approximately divide a Vhigh input in half, for example producing a Vlow at a value of Vhigh/2.2. Voltage divider 130 is configured for division by 2.2, and the charge pump operates driven by pulse generator 150 to pump charge to the Vlow terminal if Vlow drops below Vhigh/2.2. As with the boost example, the particular voltage produced and the associated division value employed with voltage divider 130 varies in different applications. In the boost or buck modes, a division of 2 may be used to exactly double or halve the input voltage to charge pump 200. As can be understood, the output voltage is expected to have some ripple and the particular division value used can be adjusted to ensure that, even with the ripple, the output voltage does not drop below a designated value such as double or half the input voltage.

Charge pump circuit 10 has numerous advantages over typical charge pumps, which often require a separate charge pump or separate driving circuitry for low-power mode operation and wake mode operation. No oscillator is required in the low-power mode, because comparator 140 and pulse generator 150 act to supply charge as needed, providing efficient and self-contained operation. For example, charge pump circuit 10 is able to maintain the supply voltage in a sleep mode using only a few nanoAmperes (nA). By contrast, if an oscillator were employed to produce a CLOCK signal during a low-power mode, the clock frequency would need to be set high enough to avoid a voltage drop for highest expected load during low-power mode. Such a setting is be inefficient for most of the duration of the low-power mode. Charge pump circuit 10 also has minimal power consumption while maintaining its output voltage, for both the doubling and divide by 2 modes. Furthermore, charge pump circuit 10 shares the same power elements in low-power and high power modes, merely switching in the CLOCK signal for high power mode operation. Voltage divider circuit 100 is a very low current, area efficient voltage divider, and in some embodiments provides for an adjustable voltage division ratio for doubling and divide by 2 modes.

Figure 2:
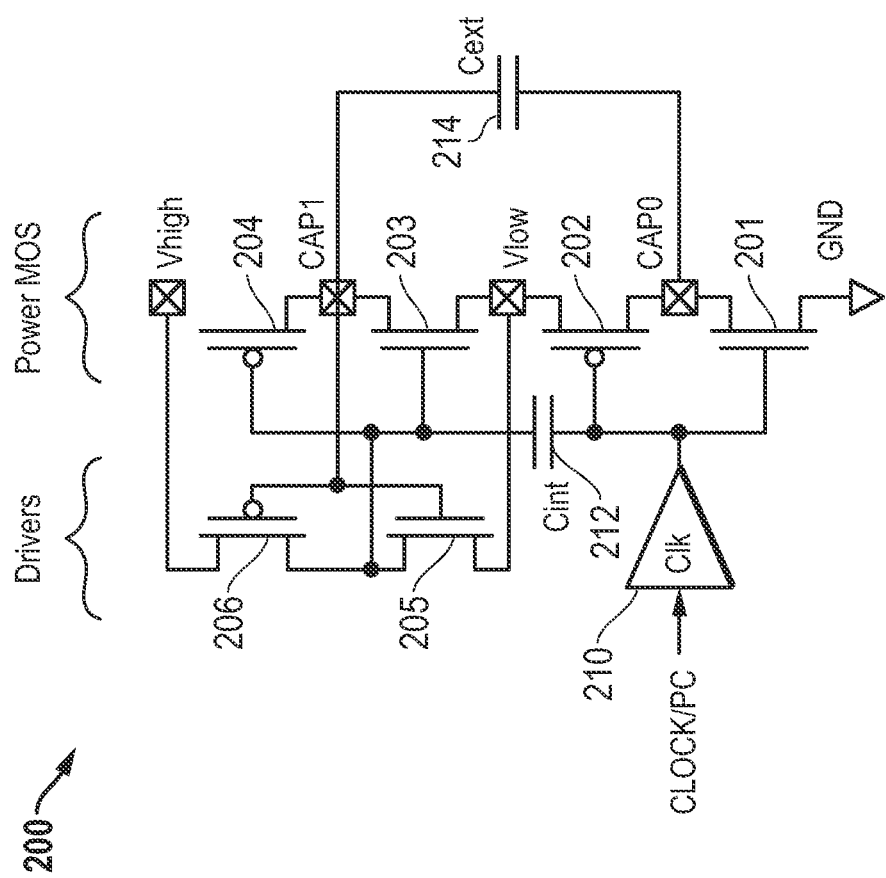
FIG. 2 illustrates in circuit diagram form an implementation of charge pump 200 of FIG. 1.

FIG. 2 illustrates in circuit diagram form an implementation of charge pump 200 of FIG. 1. Charge pump 200 is embodied on an integrated circuit with the other portions of charge pump circuit 10 (excepting any external components). Charge pump 200 is generally a doubling charge pump which approximately doubles the low supply voltage Vlow and provides it at high voltage terminal Vhigh in a boost mode, and halves a high supply voltage at high voltage terminal Vhigh to provide it at low voltage terminal Vlow in a buck mode. While the depicted charge pump 200 is able to be employed for both boost and buck operation, in any particular embodiment it may be employed for only one of these possible modes, or both. The actual ratio of Vlow to Vhigh is able to vary during operation depending on the voltage divider ratio provided by voltage divider 120. While this particular charge pump implementation is shown, other charge pump designs may also be used in various implementations.

Charge pump 200 includes a number of power metal-oxide semiconductor field-effect transistors (MOSFETs) generally indicated by the labelled "Power MOS", including NMOS transistor 201, a PMOS transistor 202, an NMOS transistor 203, a PMOS transistor 204. The Power MOS transistors may be internal or external transistors in various embodiments.

Charge pump 200 also includes an NMOS transistor 205, a PMOS transistor 206 which function as driving transistors as indicated by the label "Drivers". Charge pump 200 also includes a buffer 210, a driving capacitor 212, and an external output capacitor 214 labelled "Cext". While in this implementation an external capacitor is used for output capacitor 214, in some implementations it may be internal to the host integrated circuit implementing charge pump circuit 10. In this implementation, charge pump 200 also includes external IC terminals or pads labelled with a square and "x" for connecting Vlow, Vhigh, and GND to circuits outside of the host integrated circuit, for example to supply external integrated circuits with Vlow or Vhigh.

NMOS transistor 201 includes a source connected to the power supply ground or negative supply rail GND, a drain, and a gate coupled to clock input Clk through buffer 210. PMOS transistor 202 includes a source connected to the low voltage supply Vlow, a gate coupled to clock input Clk through buffer 210, and a drain connected to the drain of NMOS transistor 201. NMOS transistor 203 includes a source connected to low voltage terminal Vlow, a drain, and a gate. PMOS transistor 204 includes a source connected to high voltage terminal providing Vhigh, a drain connected to the drain of NMOS transistor 203, and a gate.

Output capacitor 214 is configured as a "flying" capacitor which is switched between the voltage levels of Vlow and ground, or Vhigh and Vlow to pump charge to or from the Vhigh voltage level. Output capacitor 214 includes a first terminal connected to the drain of PMOS transistor 202 at the IC terminal CAP0, and a second terminal connected to the drain of PMOS transistor 204 at IC terminal CAP1.

Buffer 210 includes input Clk receiving the switching or clock signal labelled "CLOCK/PC" for driving charge pump 200, which may be a clock signal CLOCK for normal operation or the pulse chain signal PC provided by pulse generator 150 (FIG. 1) for low-voltage or sleep mode operation. Buffer 210 is supplied by Vlow. While a driver is used at the Clk input of charge pump 200 in this implementation, in some implementations CLOCK/PC signals are connected directly through to charge pump 200's internal circuitry without re-driving them with a buffer such as buffer 210.

Drive capacitor 212 includes a first terminal coupled to clock input Clk through buffer 210 and connected to the gates of NMOS transistor 201 and PMOS transistor 202. Drive capacitor 212 also includes a second terminal connected to the gates of NMOS transistor 203 and PMOS transistor 204.

NMOS transistor 205 includes a source connected to the low voltage terminal Vlow, a gate connected to second terminal of output capacitor 214, and a drain connected to the second terminal of drive capacitor 212. PMOS transistor 206 includes a source connected to the high voltage terminal Vhigh, a gate connected to the second terminal of output capacitor 214, and a drain connected to the drain of NMOS transistor 205.

In operation, charge pump 200 drives the gates of two of the power MOSFETs at a time with the pair of driving transistors 205 and 206, switching a gate signal of the two power MOSFETs between the Vhigh and Vlow, or Vlow and ground. When the Clk signal is low, external capacitor 214 is connected to GND and Vlow using NMOS transistors 201 and 203, respectively. When the signal at Clk is high, external capacitor 214 provides its charge to Vhigh (or charges from Vhigh in buck mode) by connecting its low terminal to Vlow through PMOS transistor 202 and connecting its high terminal to Vhigh through PMOS transistor 204. Capacitor 212 is used to drive the gates of transistors 203 and 204 synchronously to the gate voltage of transistors 201 and 202. Transistors 205 and 206 are small devices employed to maintain the charge on capacitor 212.

Charge pump 200 has several advantages over a conventional charge pump architecture in which four power MOSFET transistors would be driven by Vhigh. No startup switch is required to precharge Vhigh to Vlow. Also, the leakage current is substantially reduced because the driver circuitry is operating on a lower voltage, that is from between Vlow and ground, or Vhigh and Vlow. The channel length and channel width of the Power MOS transistors can be reduced as compared to a conventional architecture, due to the lower gate voltage, thus reducing the parasitic capacitances associated with the Power MOS transistors. This capacitance reduction improves the dynamic power consumption.

Thus, various embodiments of charge pump circuits, an integrated circuit including such charge pump circuits, and corresponding methods have been described. The self-driven charge pump described herein, along with the oscillator-less driver circuitry, provide numerous advantages for providing voltage conversion across a wide range of voltages and applications, and are suitable for use with a variety of technology nodes.

The above-disclosed subject matter is to be considered illustrative, and not restrictive, and the appended claims are intended to cover all such modifications, enhancements, and other embodiments that fall within the true scope of the claims. For example, the particular technology node employed may vary. Furthermore, while the examples depicted drive the charge pump with a clock in the high-power (wake) mode, in other embodiments the change pump circuit may be entirely self-driven, in both low-power and high-power modes.

Thus, to the maximum extent allowed by law, the scope of the present invention is to be determined by the broadest permissible interpretation of the following claims and their equivalents, and shall not be restricted by the forgoing detailed description.

What is claimed is:

1. A charge pump circuit comprising:
    a charge pump with a low voltage terminal, a high voltage terminal, and a clock input;
    a voltage divider circuit with a first input coupled to the low voltage terminal, a second input coupled to the high voltage terminal, and an output configured to provide a divided voltage;
    a comparator with a first input configured to receive the divided voltage, a second input coupled to the low voltage terminal, a reset input, and a comparator output;
    a pulse generator with an input coupled to the comparator output and an output coupled to the reset input and the clock input; and
    a multiplexer configured to selectively couple the output of the pulse generator to the clock input during a sleep mode based on a sleep mode signal, and to selectively couple a clock signal to the clock input during a wake mode based on the sleep mode signal.

2. The charge pump circuit of claim 1, wherein the voltage divider circuit further comprises:
    a reference current generator with an input coupled to the low voltage terminal, and a reference current generator output;
    a current mirror with a current mirror input coupled to the reference current generator output, and a current mirror output; and
    a voltage divider with a first terminal coupled to the high voltage terminal, a second terminal coupled to the current mirror output, and an output providing the divided voltage.

3. The charge pump circuit of claim 2, wherein the voltage divider further comprises:
    a first n-type metal oxide semiconductor (NMOS) transistor with a source coupled to the current mirror output, a drain, and a gate;
    a second NMOS transistor with a source coupled to the drain of the first NMOS transistor, a drain, and a gate coupled to the drain of the second NMOS transistor and to the gate of the first NMOS transistor;
    a first PMOS transistor with a drain coupled to the source of the second NMOS transistor, a source, and a gate coupled to the drain of the first PMOS transistor; and
    a second PMOS transistor with a source coupled to the high voltage terminal, a drain coupled to the source of the first PMOS transistor, and a gate coupled to the gate of the first PMOS transistor.

4. The charge pump circuit of claim 3, wherein:
    the second PMOS transistor has an adjustable voltage threshold (Vth) under control of a first control input; and
    the first NMOS transistor has an adjustable Vth under control of a second control input.

5. The charge pump circuit of claim 2, wherein the reference current generator comprises:
    a third NMOS transistor with a source coupled to the current mirror input, a drain, and a gate coupled to the drain of the third NMOS transistor;
    a third PMOS transistor with a drain coupled to the source of the first NMOS transistor, a source coupled to the drain of the third NMOS transistor, and a gate coupled to the drain of the third PMOS transistor; and
    a fourth PMOS transistor with a source coupled to the low voltage terminal, a drain coupled to the source of the third PMOS transistor, and a gate coupled to the gate of the first PMOS transistor.

6. The charge pump circuit of claim 5, wherein the current mirror further comprises:
    a fourth NMOS transistor with a source coupled to ground, a drain coupled to the current mirror input, and a gate coupled to the gate of the third NMOS transistor; and
    a fifth NMOS transistor with a source coupled to ground, a drain coupled to the current mirror output, and a gate coupled to the gate of the fourth NMOS transistor.

7. The charge pump circuit of claim 1, wherein the charge pump comprises:
    a first NMOS transistor with a source coupled to a negative supply rail, a drain, and a gate coupled to the clock input;
    a first PMOS transistor with a source coupled to the low voltage terminal, a gate coupled to the clock input, and a drain coupled to the drain of the first NMOS transistor;
    a second NMOS transistor with a source coupled to the low voltage terminal, a drain, and a gate;
    a second PMOS transistor with a source coupled to the high voltage terminal, a drain coupled to the drain of the second NMOS transistor, and a gate;
    an output capacitor with a first terminal coupled to the drain of the first PMOS transistor and a second terminal coupled to the drain of the second PMOS transistor;
    a drive capacitor with a first terminal coupled to the clock input and a second terminal coupled to the gates of the second NMOS transistor and the second PMOS transistor;
    a third NMOS transistor with a source coupled to the low voltage terminal, a gate coupled to the second terminal of the output capacitor, and a drain coupled to the second terminal of the drive capacitor; and
    a third PMOS transistor with a source coupled to the high voltage terminal, a gate coupled to the second terminal of the output capacitor, and a drain coupled to the drain of the third NMOS transistor.

8. The charge pump circuit of claim 7, wherein:
    the first and second NMOS transistors of the charge pump and the first and second PMOS transistors of the charge pump are power MOSFETs; and
    the output capacitor is an external capacitor.

9. The charge pump circuit of claim 1, wherein the charge pump is driven without using an oscillator or clock signal during the sleep mode.

10. A method of providing a high voltage from a low supply voltage during a sleep mode and a wake mode on an integrated circuit, the method comprising:
    based on a sleep mode signal, selectively coupling a pulse generator's output signal to a charge pump's clock input during the sleep mode, wherein the charge pump is driven without using a clock signal during the sleep mode;
    driving the pulse generator based on a comparison of the low supply voltage and the high voltage;
    resetting the comparison based on the pulse generator's output signal; and
    based on the sleep mode signal, selectively coupling a clock signal to the clock input during the wake mode.

11. The method of claim 10, wherein the comparison comprises a comparison of the low supply voltage and a predetermined portion of the high voltage, and wherein the method further comprises:
creating the predetermined portion of the high voltage with a voltage divider circuit comprising:
a reference current generator with an input supplied with the low supply voltage and a reference current generator output;
a current mirror with a current mirror input coupled to the reference current generator output, and a current mirror output; and
a voltage divider with a first terminal receiving the high voltage, a second terminal coupled to the current mirror output, and an output providing the predetermined portion of the high voltage.

12. The method of claim 11, further comprising:
adjusting the predetermined portion of the high voltage to a second predetermined portion of the high voltage by adjusting two transistors in the voltage divider.

13. The method of claim 10, further comprising:
configuring the charge pump to operate in one of a boost mode and a buck mode; and
operating in the configured mode without an oscillator driving the charge pump.

14. The method of claim 10, wherein the charge pump is driven without using an oscillator during the sleep mode.

15. The method of claim 10,
wherein the pulse generator's output signal pulses at irregular intervals, and wherein
the comparison comprises a comparison of the low supply voltage and a predetermined portion of the high voltage.

16. An integrated circuit comprising:
charge pump circuit comprising:
a charge pump with a low voltage terminal, a high voltage terminal, and a clock input;
a voltage divider circuit with a first input coupled to the low voltage terminal, a second input coupled to the high voltage terminal, and an output configured to provide a divided voltage;
a comparator with a first input configured to receive the divided voltage, a second input coupled to the low voltage supply, a reset input, and a comparator output; and
a pulse generator with an input coupled to the comparator output and an output coupled to the reset input and the clock input,
wherein the voltage divider circuit further comprises:
a reference current generator with an input coupled to the low voltage terminal and a reference current generator output;
a current mirror with a current mirror input coupled to the reference current generator output, and a current mirror output; and
a voltage divider with a first terminal coupled to the high voltage terminal, a second terminal coupled to the current mirror output, and an output configured to provide the divided voltage, wherein the voltage divider further comprises:
a first n-type metal oxide semiconductor (NMOS) transistor with a source coupled to the output of the current mirror, a drain, and a gate;
a second NMOS transistor with a source coupled to the drain of the first NMOS transistor, a drain, and a gate coupled to the drain of the second NMOS transistor and to the gate of the first NMOS transistor;
a first PMOS transistor with a drain coupled to the source of the second NMOS transistor, a source, and a gate coupled to the drain of the first PMOS transistor; and
a second PMOS transistor with a source coupled to the high voltage terminal, a drain coupled to the source of the first PMOS transistor, and a gate coupled to the gate of the first PMOS transistor.

17. The integrated circuit of claim 16, wherein:
the second PMOS transistor has an adjustable voltage threshold (Vth) under control of a first control input; and
the first NMOS transistor has an adjustable Vth under control of a second control input.

18. The integrated circuit of claim 16, wherein the reference current generator further comprises:
a third NMOS transistor with a source coupled to the current mirror input, a drain, and a gate coupled to the drain of the third NMOS transistor;
a third PMOS transistor with a drain coupled to the source of the first NMOS transistor, a source coupled to the drain of the third NMOS transistor, and a gate coupled to the drain of the third PMOS transistor; and
a fourth PMOS transistor with a source coupled to the low voltage terminal, a drain coupled to the source of the third PMOS transistor, and a gate coupled to the gate of the first PMOS transistor.

19. The integrated circuit of claim 16, further comprising:
a multiplexer selectively coupling the output of the pulse generator to the input of the charge pump during a sleep mode based on a sleep signal, and selectively coupling a clock signal to the clock input during a wake mode based on the sleep signal.

* * * * *